May 7, 1946.　　　　R. HARTE　　　　2,399,801
METHOD OF MAKING TOOL BLADES
Filed Jan. 14, 1944
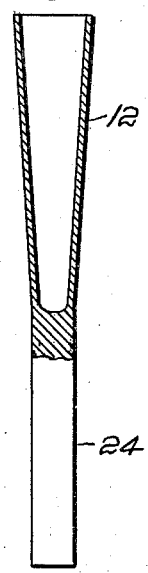
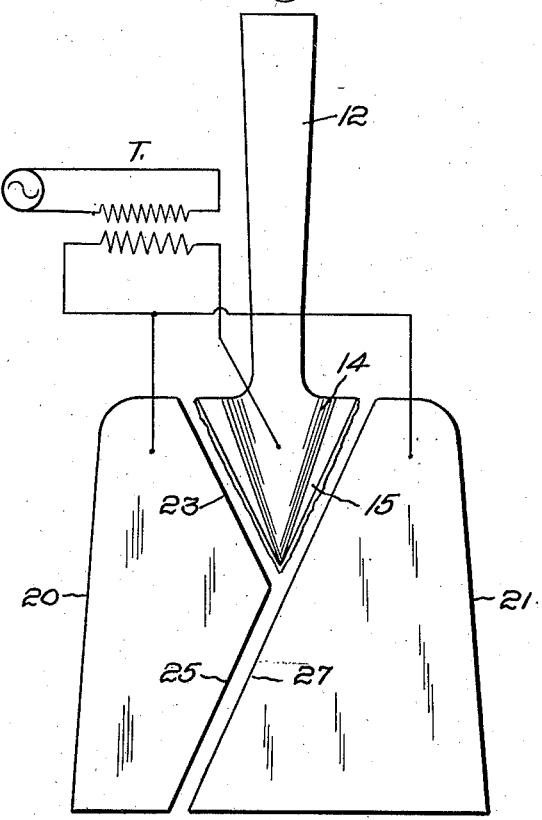
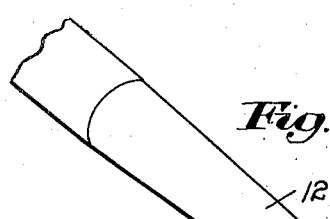
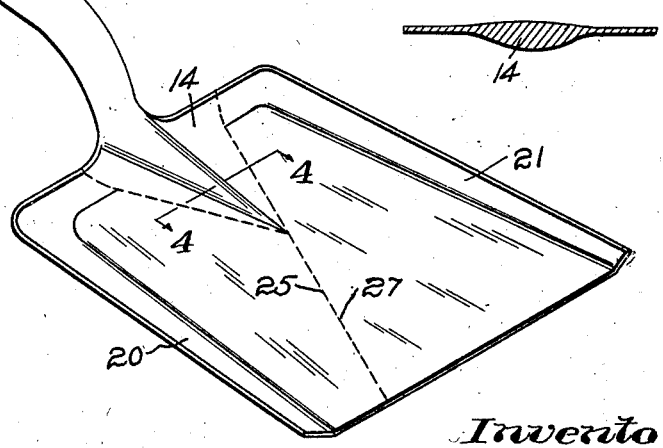
Inventor:
Richard Harte.
by Emery, Booth, Townsend, Miller & Neidner
Attys Patented May 7, 1946

2,399,801

UNITED STATES PATENT OFFICE 2,399,801

METHOD OF MAKING TOOL BLADES

Richard Harte, Parkersburg, W. Va., assignor to Ames Baldwin Wyoming Co., Parkersburg, W. Va., a corporation of Delaware Application January 14, 1944, Serial No. 518,301

5 Claims. (Cl. 76—113)

This invention relates to tools of the type having a broad, relatively thin blade or head and a manipulating handle. Garden hoes and shovels are examples and the tools may, for present purposes, be generically termed agricultural tools although obviously not always used for handling arable earth. Coordinate objects of the invention are to provide a strong and simple blade construction for such tools and an inexpensive and rapid method for producing the same.

If we consider, for example, a typical hoe of good quality, it will be seen that the wide body portion of the blade has projecting from the back thereof a stem portion providing for its union with a handle in a joint of the plug and socket type, in the case of the shank type of hoe being the male element or plug, and in the case of the socket type of hoe the female element or socket. At the end of this stem where it joins the blade it merges into a frog by which the broad, thin body of the blade, usually of substantially uniform thickness, is secured. For convenience I shall term this major portion of the blade the "palm," distinguishing it from the frog which forms a part or an integral part of the blade as such. The frog provides a relatively thick portion at the rear of the blade which may be wider than the shank and extends forwardly a substantial distance toward the working edge of the blade, usually tapering in thickness, and is designed to provide a strong connection of the blade to the handle and to distribute the strains of use over a wide area of the palm. In a forged hoe or in a shovel of the solid shank type the palm, frog and handle-attaching stem are forged and rolled from a unitary blank having initially a very slight similarity to the finished article.

With the modern development of fusion welding many proposals have been made to apply it to the manufacture of the blades of agricultural tools. Seam welding has been extensively and practically used for the manufacture of shovels of the plain back type to secure the head of the front strap to the rear face portion of the blade, as was formerly done by the blacksmith's hammer weld. Various proposals for securing together a blade proper or palm to a stem portion by edge to edge butt welding or by arc welding as hitherto made have been found to offer certain difficulties in practice and have not come into general use.

Conventionally in the manufacture of tool blades the main body or palm of the blade has been treated as a unit, either rolled out as a portion of an integral blank or secured as a unit to a stem portion as in the riveted type of hoe or shovel. In departing from this conception I am enabled by utilizing welding to construct in a particularly simple and expeditious manner a strong and simple blade.

My invention will be well understood by reference to the following description of the illustrative embodiment thereof shown by way of example in the accompanying drawing wherein I have shown the manufacture of a shovel having a handle-receiving socket and wherein:

Fig. 1 is a central vertical section through a blank from which the frog and socket are formed;

Fig. 2 is a plan showing the various parts collocated adjacent their final position and illustrating diagrammatically the manner of connection;

Fig. 3 is a perspective of the completed blade with a fragment of the handle united therewith; and Fig. 4 is a section on the line 4—4 of Fig. 3 on an enlarged scale.

In the form of the invention shown by way of example I form the stem of the blade, in the present instance a female member or socket, and the frog as an integral one-piece member, while the palm of the blade comprises elements butt welded to the laterally facing edges of the frog and, forwardly of the same, to each other.

Referring to Fig. 1, I there show a socket and frog-forming blank which may conveniently be an extrusion manufactured as disclosed in the patent to Criley 2,054,244 and comprising the rearwardly opening socket 12, the wall of which tapers rearwardly as illustrated, and an integral rod-like extension 24 below the bottom of the socket, from which extension the frog is formed. This portion 24 is by means of a suitable forging hammer formed into a frog 14. This frog, as illustrated in Fig. 2, is of arrowhead shape in plan and conveniently with its greatest width at the rear greater than the diameter of the socket immediately to the rear thereof. The frog is of greatest thickness centrally and tapers toward the sides and toward the "point" of the arrowhead, the cross sections being generally lenticular, that is, convex on one or both sides, the latter being illustrated in Fig. 4. The flash formed at the sides of the frog 14 may be trimmed away and the part may conveniently be manipulated to leave remaining a narrow central projection 15 from the sides of the arrowhead of a thickness corresponding to that of the palm-forming portions of the blade which are to be united thereto The palm of the blade is formed of pieces 20 and 21, which conveniently may be dissimilar in form as will be explained, cut from sheet steel of substantially the desired finished thickness. Herein I have shown the left-hand element 20 as presenting at its right-hand edge the sides 23 and 25 which define an angle complementary to the vertex angle of the arrowhead. The piece 20 may be advanced toward a side face of the arrowhead in a direction perpendicular to the edge 23 and butt welded thereto as indicated diagrammatically in Fig. 2 by the showing of the transformer T, the edge 23 uniting in the example shown with the projecting rib 15 at the side of the frog, which rib is consumed or burned away in the welding process. When the part 20 has thus been attached, the edge 25 forms a continuation of the right-hand edge of the frog, and to these aligned edges the straight edge 27 of the palm-forming piece 21 may be most conveniently united, the edges 25 and 27 merging by interfusion into a joint indicated in Fig. 3 by a dotted line but which in the completed shovel after polishing is imperceptible.

The tool is completed by bending the stem portion in such manner as to dispose the handle which is joined thereto in the desired angular relation to the palm of the blade while the blade may be concaved or otherwise shaped as required by the type of tool being made.

All the parts may be made from high-carbon steel and the finished blank will be essentially a one-piece uniform structure. In general a shovel as shown will compare favorably with a so-called solid shank shovel of the prior art shaped laboriously from a heavy blank by a long series of operations. The method of manufacture is expeditious and inexpensive.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A method of forming a blade for an agricultural or like tool characterized by the steps of butt welding the edges of two palm-forming elements respectively to lateral edges of an arrowhead-shaped frog and, forwardly of the frog, to one another.

2. A method of forming a blade for an agricultural or like tool characterized by the steps of butt welding the edges of two palm-forming elements respectively to lateral edges of an arrowhead-shaped frog and, forwardly of the frog, to one another along a line which is a continuation of one of said lateral edges.

3. A method of forming a blade for an agricultural or like tool which comprises forming a tubular handle-receiving socket with a bar-like forward projection, forging the projection to the form of an arrowhead-shaped frog and butt welding the edges of two palm-forming elements respectively to lateral edges of the frog and, forwardly thereof, to one another.

4. A method of forming a blade for an agricultural or like tool which comprises forging the end portion of a blank to provide a frog, arrowhead-shaped in plan and substantially lenticular in section, the other end portion of the blank extending rearwardly in the direction of the shaft of such an arrowhead and providing a stem portion for union with a handle and butt welding the edges of two palm-forming elements respectively to lateral edges of the frog and, forwardly thereof, to one another.

5. A method of forming a blade for an agricultural or like tool which comprises providing a one-piece unitary blank having a flaring handle-receiving socket opening at one end thereof, forging the other end to provide a frog of arrowhead shape in plan and butt welding the edges of two palm-forming elements respectively to lateral edges of the frog and, forwardly thereof, to one another.

RICHARD HARTE.